(12) United States Patent
Novak et al.

(10) Patent No.: US 8,925,444 B2
(45) Date of Patent: Jan. 6, 2015

(54) MACHINE TO FAST COOK RAW FOOD STUFF INCLUDING DRY-GOODS SUCH AS PASTA ON DEMAND

(71) Applicants: John T. Novak, Downers Grove, IL (US); Henry Narcisi, Frankfort, IL (US); John Cammarata, Frankfort, IL (US)

(72) Inventors: John T. Novak, Downers Grove, IL (US); Henry Narcisi, Frankfort, IL (US); John Cammarata, Frankfort, IL (US)

( * ) Notice: Subject to any disclaimer, the term of this patent is extended or adjusted under 35 U.S.C. 154(b) by 104 days.

(21) Appl. No.: 13/797,735

(22) Filed: Mar. 12, 2013

(65) Prior Publication Data

US 2013/0263746 A1 Oct. 10, 2013

Related U.S. Application Data

(60) Provisional application No. 61/685,140, filed on Mar. 13, 2012.

(51) Int. Cl.
*A47J 27/00* (2006.01)
*A47J 27/18* (2006.01)
(52) U.S. Cl.
CPC ..................................... *A47J 27/18* (2013.01)
USPC ............................................. 99/330; 99/357
(58) Field of Classification Search
CPC ............ A47J 27/18; A47J 36/24; A47J 27/10
USPC ................... 99/330–332, 352, 339, 355, 357, 99/359–360, 403–404, 407, 410; 426/541, 426/557, 499

See application file for complete search history.

(56) References Cited

U.S. PATENT DOCUMENTS

| 4,214,514 | A | * | 7/1980 | Contino et al. | 99/330 |
| 4,803,916 | A | * | 2/1989 | Tacconi | 99/352 |
| 5,172,627 | A | * | 12/1992 | Narcisi et al. | 99/330 |
| 5,361,683 | A | * | 11/1994 | Silvestrini et al. | 99/356 |

* cited by examiner

*Primary Examiner* — Dana Ross
*Assistant Examiner* — Phuong Nguyen
(74) *Attorney, Agent, or Firm* — John Novak (57) ABSTRACT

A machine to fast cook raw food-stuff including dry-goods such as pasta on demand. Cook time is user selectable and varies from less than one minute to 4 minutes. Higher cook times are user programmable and food type dependent. The separate boiler and cook chamber are sealed within an enclosure containing a heat transfer fluid. Porting enables the ingress, egress and transfer of raw and cooked food-stuff, liquid and vapor. Proprietary slide plate valves control food-stuff ingress and egress to the cook chamber. The upper slide plate valve assembly separates the cook chamber from the raw food ingress staging aperture. Rinse water and cooked food-stuff discharges into the drain pan containing and enclosing the food collection strainer through the lower slide plate valve assembly. Discharge of the cooked food product completes the cook cycle. The cooked food can then be deposited from the strainer onto a serving vessel.

31 Claims, 4 Drawing Sheets

MACHINE TO FAST COOK RAW FOOD STUFF INCLUDING DRY-GOODS SUCH AS PASTA ON DEMAND

FIELD OF THE INVENTION

The present invention relates to the field of machines that cooks individual and multiple portions of a variety of raw food-stuff including dry-goods such as pasta using process controlled and guided automation programmed for limited operator intervention. Fast-cook technology must address consistent quality, the capability to fast-cook a variety of raw food products, and be capable of being integrated for use in hospitality, restaurant and fast-food markets, as well as self-service venues such as vending, cafeterias, and the like. Prior art machines of this kind required the use of proprietary pasta designs to enable quick cooking, or did not include reliable controls, operational apparatus, and process designs. This design incorporates improvements over prior art necessary to reliably monitor and maintain process temperature and pressure conditions required for consistent cooking quality and provide reliable and consistent machine operation, and enable flexibility to cook a variety of commonly available raw food-stuffs including dry-goods such as commercially available pasta, all within cooking times of 4 minutes or less. The machine in accordance with the present invention includes such controls and apparatus as well as an innovative, efficient, yet simplified cooking design, including proprietary process controls, and product delivery and discharge valves, thus solving the problem of failing to reliably and consistently cook a variety of commercially available as well as proprietary raw food-stuffs.

Prior art machines for cooking foods such as spaghetti and other pasta include those disclosed in the following United States patents:

U.S. Pat. No. 5,033,364 which issued Jul. 23, 1991 on an application filed by the same inventors as in this case.

U.S. Pat. No. 4,901,632 discloses a machine which performs a three phase cooking process and utilizes a plurality of cooking chambers.

U.S. Pat. No. 4,869,160 discloses a machine for fast cooking of pasta and the like which also utilizes a plurality of cooking chambers, in this case two, and a food transfer system comprising a conduit and valve through which the pasta must be moved in order to complete the second phase of the cooking cycle.

U.S. Pat. No. 4,803,916 discloses a machine for rapidly cooking batches of spaghetti, which also utilizes cooking chambers and requires a food transfer system comprising a valve and conduit through which the food has to be moved from the first cooking chamber to the second.

U.S. Pat. No. 4,821,632 discloses an apparatus for automatically cooking pasta comprising a basket to hold the pasta inside a housing which receives heated water, two heat exchangers and a recirculation system to conserve and re-utilize heat from previously used water to cook a previous batch of pasta.

U.S. Pat. No. 4,803,917 discloses an apparatus to automatically cook pasta and deposit it on a serving plate, comprising a basket to hold the serving of pasta to be cooked, a cooking vessel to receive boiling water which can be moved upwardly to receive the basket of pasta therein for cooking, and apparatus to thereafter move the basket of cooked pasta into position over the serving plate whereupon it opens to deposit the pasta on the plate.

U.S. Pat. No. 4,741,261 discloses a cooking apparatus for simultaneously cooking several separate quantities of pasta, including a plurality of perforated baskets to hold each quantity of pasta, and a chamber of steam and hot water in which the baskets of pasta are suspended for cooking.

U.S. Pat. No. 4,214,514 discloses a cooking device for cooking individual servings of food, comprising a plurality of perforated pots to hold individual servings of pasta or the like, into which boiling water is pumped from a reservoir to cook the pasta, after which the pots are lifted to let the water drain through the perforations and the individual servings can then be removed for eating.

U.S. Pat. No. 4,175,482 discloses an automatic high pressure flash cooker to cook beans or grains under high pressure steam, comprising a steaming chamber in which the food product is exposed to steam, and conduits to introduce the steam therein as well as to later drain the water and steam there from, after which the flash-cooked beans or grains are removed.

U.S. Pat. No. 3,928,045 discloses an automatic cooking and vending machine for boiled noodles, comprising a refrigeration chamber to hold containers of precooked or boiled noodles, a cooking chamber to heat the noodles and eventually add a broth thereto for flavoring, then dispensing the broth flavored noodles in the containers for eating.

U.S. Pat. No. 3,790,391 discloses an apparatus for steam pressure cooking of food, comprising a steam pressure cooker, an open top container therein to hold the food to be cooked, a steam distributing pipe having apertures for release of steam positioned below the open top containers, and steam from an external source is pumped into and through the steam distributing pipe from which steam exits through the apertures and through the food in the open top container positioned above the steam distributing pipe.

BACKGROUND OF THE INVENTION

Fast-cook technology must address consistent quality, the capability to quickly cook a variety of commercially available raw food-stuffs, cook said food-stuff at a significant time and energy savings, aid the end-user and commercial enterprises to meet the demands of economic operation, rapid order turnaround, preparation cost savings, reduced food waste, as well as support for innovative machine applications such as vending. Prior art machines of this kind were not capable of reliable and consistent fast-cook operation, were limited to proprietary raw food designs to enable quick order to plate turnaround while sacrificing economy, and suffered from inconsistent cooking quality of raw food-stuffs in commercial environments. Additionally prior art did not include the process elements and apparatus designs included in this patent, necessary to reliably monitor and maintain the process temperatures and pressures required to enable consistent cooking quality, nor were prior art designs robust enough for reliable machine operation in a compact package that would function reliably, provide for user-selectable cooking controls, and yet operate with minimal user intervention.

The design of the invention is ideally suited to service the fast food, hospitality and vending industries that require fast cooking of raw food-stuffs in 4 minutes or less, within the confines of a single cooking chamber using superheated water. Superheated water promotes the uniform heating and accelerated hydration for high-speed cooking of the targeted food-stuff.

The raw food-stuff is either automatically or manually introduced into the cook chamber. The cook chamber containing the raw food-stuff is charged with water superheated above 100 degrees Celsius and pressurized. Using process control circuitry, sensors, smart heating elements and software, the process is more efficiently and reliably managed. When cooking has proceeded for a pre-set period of time, at controlled temperatures and pressures, the chamber is decompressed, the cooked product rinsed with cooler water below 100 degrees Celsius, and then discharged into the food collection strainer. Process control includes sensors to monitor both temperature and pressure in the boiler and cook chamber, includes feedback loops to modulate both the temperature and pressure of the water contained within the boiler and in cook chamber, and proprietary programming to take advantage of control timers, counters, switches, relays, timer relays and other soft and hard devices to enable a precise sequence of operation and control. Temperatures and pressures are adjustable, monitored and controlled to maintain consist cooking throughout the cook cycle. Once cooked, rinsed and discharged, the food-stuff is emptied from the strainer and the strainer reinserted. The machine is then ready for the next cooking cycle.

It is another advantage of the invention to incorporate a cooking chamber and water boiler that are housed within a sealed enclosure containing a heat transfer fluid. The heat transfer fluid is used to convey heat from the heating elements immersed in the contained fluid. The heat transfer fluid bathes the outer walls of the boiler and cook chambers. The cooking assembly enclosure containing the heat transfer fluid is not pressurized and is protected from any pressurization due to fluid expansion by added volumetric capacity within the vessel, redundant temperature controls, and pressure relief. The volumetric capacity of the cooking assembly enclosure surrounding the boiler and cook chamber is designed to contain sufficient heat transfer fluid to provide a heat reservoir, which reduces the time necessary to heat the water contained within the boiler, provides heat to maintain the cook chamber temperature without the use of heating elements internal to the cook chamber, replaces heat lost during the cooking process, and compensates for any extraneous conductive, convective and radiant heat losses, while providing this make up heat quickly enough to ready the process for the subsequent cooking cycle without delay. The cooking assembly is comprised of an enclosure sealably attached to the cooking assembly top and bottom end plates that complete the enclosure. The end plates are fabricated with multiple penetrations and porting. One or multiple heating elements are mounted through the plates and into the heat transfer fluid to provide the quantity of energy necessary to heat the heat transfer fluid to design process temperatures.

The number of elements used is determined by the size of the fluid chamber, the heating demand of the cook chamber, measured and calculated heat losses, the thermal characteristics of the heat transfer fluid, heat transfer enclosure surface area, materials of construction, and insulation. One or more additional heating elements reside within the boiler and provide additional heating to quicken the elevation of the boiler water to its superheated target temperature.

The superheat boiler and the cook chamber are designed to function as pressure vessels that normally operate at a pressure range of 350 psi and up to but not to exceed a normal operating pressure of 500 psi at design operating temperatures. Safety factors are used in the design of the apparatus. Design temperature of the device is to operate at a temperature of 350 Fahrenheit and under normal operations up to but not to exceed 500 Fahrenheit. These operating conditions are controlled, balanced and maintained by process control circuits, redundant sensors with safety backups and programming. Cooking is by superheated water and not steam and the equipment and process control is designed to prevent significant steam generation during the cooking cycle. Temperature and pressure are adjusted by programming to tailor the operation of the device to the most efficient temperature and pressure to speed-cook the desired raw food-stuff.

Supply water is pumped into the boiler up to a pre-set pressure using a pressure pump. Once heated within the boiler, the superheated water is transferred from the boiler to the cook chamber and the pressure in the cook chamber is boosted by a second pressure pump that can operate at design temperatures and reliably increase the superheated water in the cook chamber to the design pressures. This second pressure pump also maintains the cook chamber pressure for the duration of the cook cycle. Water flows into the boiler and cook chamber by fluid conduits and flow is regulated by process controlled solenoid valves.

It is another advantage of the invention to incorporate unique process control and automation including unique proprietary slide plate valve technology, positional feedback of the proprietary slide plate valves, surface temperature controlled heating elements that limit the outside skin temperature of the elements, and their use immersed in the heat transfer fluid and within the boiler. The heating elements are controlled by independent temperature probes and process control circuits. The heating element surface temperature is independently controlled by built-in limiters, which prevent the skin temperature from exceeding a pre-set temperature. High skin temperature promotes heat transfer fluid degradation and charring, and boiler over-pressurization and steam formation. The proprietary nature of the cooking chamber inlet and discharge slide plate valves include the overall design, sealing design, sealing methodology, slide plate supports and surface finishes. The valves use a sealing design that increases sealing force as process pressure increases, providing a positive and reliable seal. The design allows for an increase in sealing force without significantly increasing the motor force necessary to actuate the valve and linearly reposition the valve plate to and from the target position.

The pumps, solenoid valves, slide plate valves including associated drives, and the self-regulating heating elements are controlled by proprietary programmable process control circuits. The process control circuits are capable of factory and user input to change key operating criteria and provides selected data output and usage statistics. The programmable process control circuits utilize sensors that detect water temperature, heat transfer fluid temperature, boiler and cook chamber pressures, and slide plate position. Safety devices include pressure relief, redundant temperature probes, pressure transducers, and pressure switches. Operator safety dictates that the device be connected to main power using GFI circuit protection. All operator capable access points are restricted by design. These components are interlocked and electronically monitored for presence by the process control circuit.

SUMMARY OF THE INVENTION

Accordingly, the present invention is directed to a device that fast-cooks various food-stuffs such as pasta, lentils, and vegetables and substantially obviates one or more problems due to limitations and disadvantages of the related art. There is disclosed a device for fast cooking, which includes one or a plurality of cooking assemblies, a framework for supporting said cooking assembly, a method to introduce raw food-stuff to be cooked, a method to discharge the cooked food-stuff from said cooking chamber, a method to superheat the cooking water and transfer the superheated water from the boiler to the cooking chamber, a method to maintain and control the process temperature, including the use of a heat transfer fluid, and a process control stratagem, which is comprised of a process control circuits and feedback control loops, motors, heating elements, temperature probes, pressure switches, pressure transducers, pressure relief safety valves, and pressure pumps. A supporting framework provides for mounting of components and an enclosing cover. The unit is designed to be nested together with other units enabling multiple units to share a common frame, with a smaller footprint than would multiple units if staged side by side. The invention can be operated easily and installed on a counter or a stand set at normal working height.

The device has a pressurized boiler to heat water to a process temperature not to exceed 500 degrees Fahrenheit and at a process pressure not to exceed 500 psi, a cook chamber to receive a portion of an uncooked food-stuff such as pasta and then receive superheated and pressurized water from the boiler. Cook time varies depending on the food-stuff from less than one minute to approximately 4 minutes, and can be additionally varied to include such features as a rinse cycle when cooking food-stuffs that needs to be rinsed for tempering and residue removal. The pressure boiler and cook chamber are contained within an enclosure containing a heat transfer fluid to aid heating and multiple heating elements. The top and bottom end plates of the enclosure are common to the ends of the boiler and cook chamber. The end plates are ported enabling the transfer of liquid and vapor as well as the depressurizing the cooking chamber and the introduction of rinse water. The depressurizing process includes venting the superheated cook water through one or more solenoid valves and conduits to route the flashed superheated vapor to a condensing chamber. Most of the condensed vapor cools in this chamber and can be safely discharged with the accumulated drain water through a discharge outlet. The food-stuff ingress and egress to the cook chamber is by 2 proprietary slide plate valves located on the cooking assembly end plates to which the ends of the cook chamber are fixedly and functionally attached. Completion of the cooking cycle includes venting the superheated water, rinsing, draining of rinse water, and discharging the cooked food-stuff from the cook chamber through the lower slide plate valve into the food collection strainer. Once discharge is completed, the strainer interlock releases the strainer and the cooked food-stuff can in turn be deposited from the strainer onto a serving vessel. The upper slide plate valve at the top of the cooking chamber separates the cook chamber from the raw food staging aperture. When the upper slide plate valve is opened, the staged portion of raw food-stuff is drops into the cook chamber. Only when the strainer has been reinserted into the device and sensed by the process control circuit will the upper slide plate valve open allowing the staged portion of raw food-stuff enter the cook chamber, and the device enabled to begin the next cooking sequence.

BRIEF DESCRIPTION OF THE DRAWINGS

A complete understanding of the present invention may be obtained by reference to the accompanying drawings, when considered in conjunction with the subsequent, detailed description, in which:

FIG. 1 is a detail view of a flow chart specifying the process strategy and operating elements including fluid flows, product delivery and discharge, safety and process control, and the interrelationship of these elements to the overall machine design. Elements of the process are denoted by numbering. Major elements are listed below.
  5 pressure pump
  8 rinse solenoid valve
  12 boiler
  13 cooking assembly
  13a cooking assembly top plate
  13b cooking assembly bottom plate
  13c cooking assembly enclosure
  14 cook chamber
  16 heating elements
  18 heat transfer fluid
  19 temperature probe
  26 expansion tank conduit
  27 expansion tank
  30 high temperature pressure switch
  31 low temperature pressure switch
  32 pressure relief valve
  33a upper slide plate valve assembly
  33b lower slide plate valve assembly
  38 high pressure temperature pump
  47 cook chamber inlet solenoid valve
  56 first venting solenoid valve
  58 second venting solenoid valve
  62 raw food ingress staging aperture
  63 cooked food collector
  64 drain pan
  70 first pressure transducer
  72 second pressure transducer
  80 strainer interlock
  82 strainer sensor
  84 food ingress staging aperture sensor;

FIG. 2 is a right perspective view of a typical machine assembly. The 3-D perspective view of major components depicts their relationship as mounted onto a typical supporting framework. The assembly elements below are denoted by number.
  5 pressure pump
  13a cooking assembly top plate
  13c cooking assembly enclosure
  27 expansion tank
  33a upper slide plate valve assembly
  34 cam
  38 high pressure temperature pump
  62 raw food ingress staging aperture
  63 strainer
  64 drain pan
  80 strainer interlock;

FIG. 4 is an exploded view of a cooking assembly. It includes the cooking assembly enclosure which encloses the boiler and cook chamber when sealed to the top and bottom plates, and contains the heat transfer fluid. Penetrations of the top and bottom plates are for the attachment of the upper and lower slide plate valves, fluid transport, ingress and egress of food-stuffs, and the mounting of heating elements, temperature probes and fluid conduits. The upper slide plate valve assembly, drive cam, and drive motor, are also shown. Elements of this assembly are denoted by numbering.

12 boiler
13a cooking assembly top plate
13b cooking assembly bottom plate
13c cooking assembly enclosure
14 cook chamber
33a upper slide plate valve assembly
34 cam
35 slide plate valve assembly drive mechanisms.

For purposes of clarity and brevity, like elements and components will bear the same designations and numbering throughout the Figures.

DESCRIPTION OF THE PREFERRED EMBODIMENT

A fast cook pasta machine in accordance with this invention that includes the following:

A raw food ingress staging aperture 62 that is positioned above the inlet of a cook chamber 14 separated by a proprietary design upper slide plate valve assembly 33a. The raw food ingress staging aperture 62 is used to temporarily contain a portion of an uncooked food-stuff such as dry pasta prior to cooking and aligns and directs the food stuff for entry through the upper slide plate valve assembly 33a and into the cook chamber 14. When the upper slide plate valve assembly 33a opens, the food stuff contained within the raw food ingress staging aperture 62 is dispensed and directed into the cook chamber 14. The upper slide plate valve assembly 33a is rigidly mounted to the top-side surface of the cooking assembly top plate 13a, and the lower slide plate valve assembly 33b is rigidly mounted to the bottom-side surface of the cooking assembly bottom plate 13b. Both valve assemblies are aligned directly with the center bore of the cook chamber 14. The upper slide plate valve assembly 33a is actuated by the upper slide plate valve assembly drive mechanism 35a, and the lower slide plate valve assembly 33b is actuated by the lower slide plate valve assembly drive mechanism 35b. Both are electrically driven and independently processor controlled by a common process control circuit.

Figure 1:
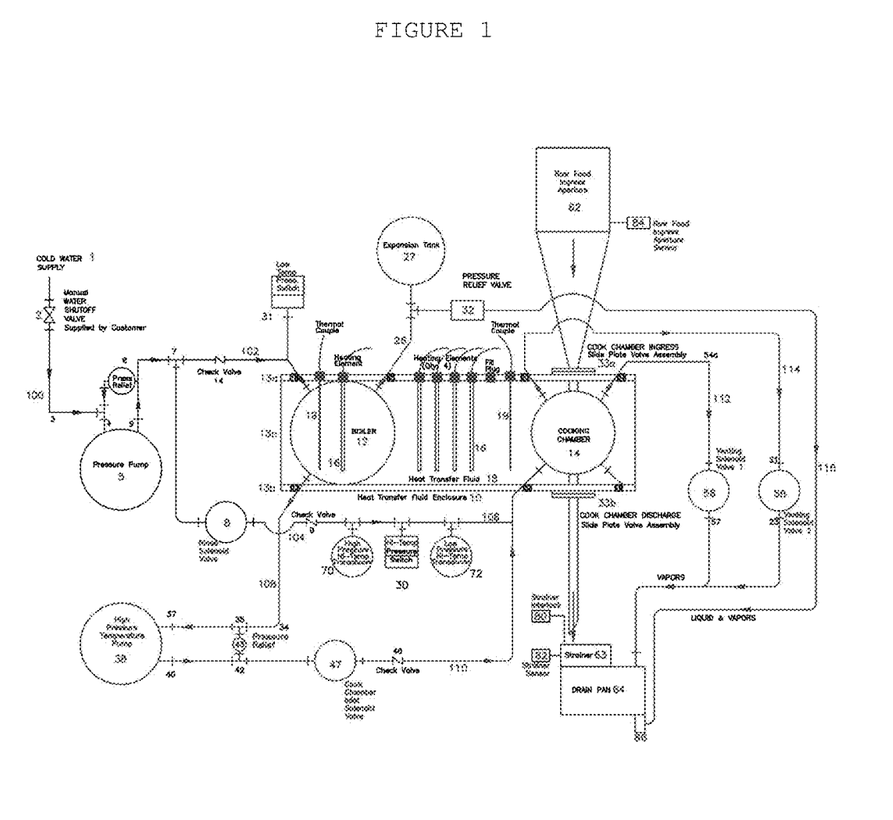

An electrically powered pressure pump 5 delivers supply water 1 to the boiler 12 until the boiler 12 is filled and the design pressure is reached. Boiler 12 is pressurized between five and ten atmospheres (75 to 150 psi) in order to superheat water. Final pressure is factory-adjustable and the set is dependent upon the design boiler 12 output temperature. Boiler 12 pressures are monitored and controlled by a low temperature pressure switch 31. A safety feature to prevent excessive boiler 12 pressure includes the incorporation of a pressure relief valve 32 into the design, which opens in any extreme over-pressure situation. Any flow from the pressure relief valve 32 is diverted to a drain line by the pressure relief conduit 116, which is then tied into external drainage. The pressure pump 5 is connected to supply water 1 by the water supply conduit 100 and connects to the inlet of the boiler 12 by the boiler feed conduit 102. The pressure pump 5 is powered by a power relay that energizes the pump and is controlled by the process control circuit. The low temperature pressure switch 31 is mounted on the boiler feed conduit 102 and electrically connected to the pressure pump 5 control circuit to energize the pressure pump 5 when pressure within the boiler 12 has dropped below a factory preset pressure. When boiler 12 pressure drops below the minimum predetermined set-point, the regulating low temperature pressure switch 31 closes the electrical control circuit, energizing the pump relay and in turn the pressure pump 5 to increase the pressure within the boiler 12 to a predetermined maximum set-point.

Electric heating elements provide heat inside and outside of the boiler 12 raising the water temperature within the boiler 12 to the design temperature. A temperature sensor within the heating element 16 inside the boiler 12 detects the temperature within the boiler 12 and can open and close the electrical power to the heating element 16 maintaining the pre-selected temperature of the water within the boiler 12.

A rigidly encapsulated, variable volume expansion tank 27 is mounted and securely installed to enable the boiler 12 water access to a volume of space that can expand to accommodate liquid volume changes as the boiler 12 water thermally expands and contracts. The expansion tank 27 also acts as a water reservoir and guarantees a consistent supply of pressurized water to the boiler 12 and in turn to the high pressure temperature water pump, when the cook chamber 14 is being charged and pressurized with superheated water. The water expansion tank 27 is connected to the cold water side of the boiler 12 by an expansion tank conduit 26 that is unencumbered by valves or restrictions.

Figure 3:
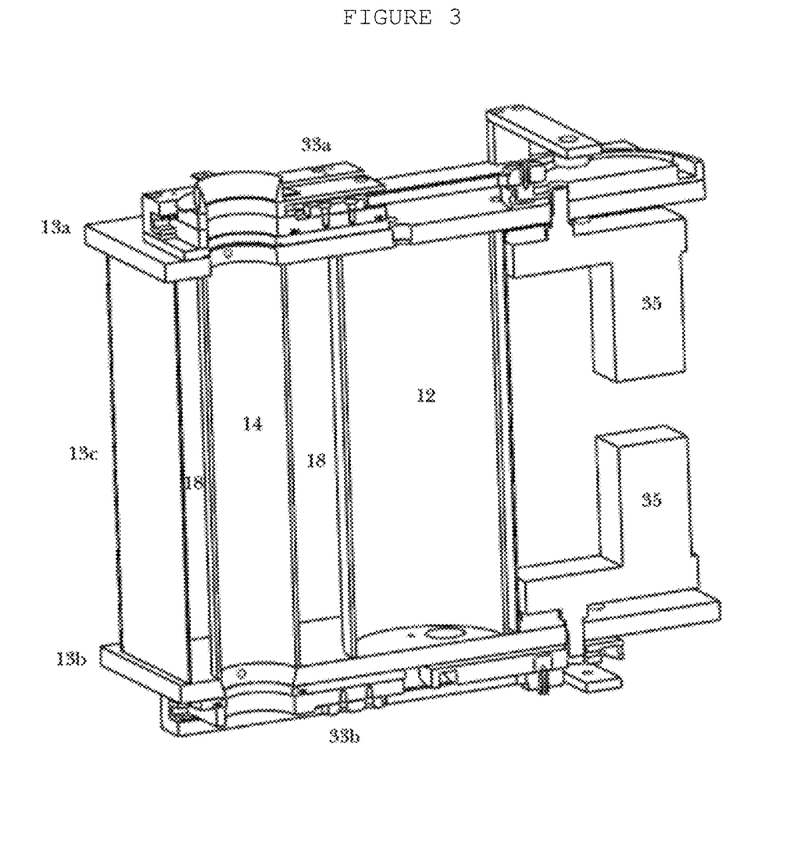
FIG. 3 is a section view of a boiler and cooking chamber assembly. The drawing depicts the relative size and relationship of the cooking chamber and boiler within the confines of the cooking assembly. Also detailed are the ported top and bottom plates and the upper and lower slide valves that are fastened to the enclosure top and bottom plates respectively. The slide valves enable ingress and egress of food stuffs to the cook chamber. The elements of this assembly are denoted by numbering.
  12 boiler
  13a cooking assembly top plate
  13b cooking assembly bottom plate
  13c cooking assembly enclosure
  14 cook chamber
  18 heat transfer fluid
  33a upper slide plate valve assembly
  33b lower slide plate valve assembly
  35 slide plate valve assembly drive mechanisms.
Figure 4:
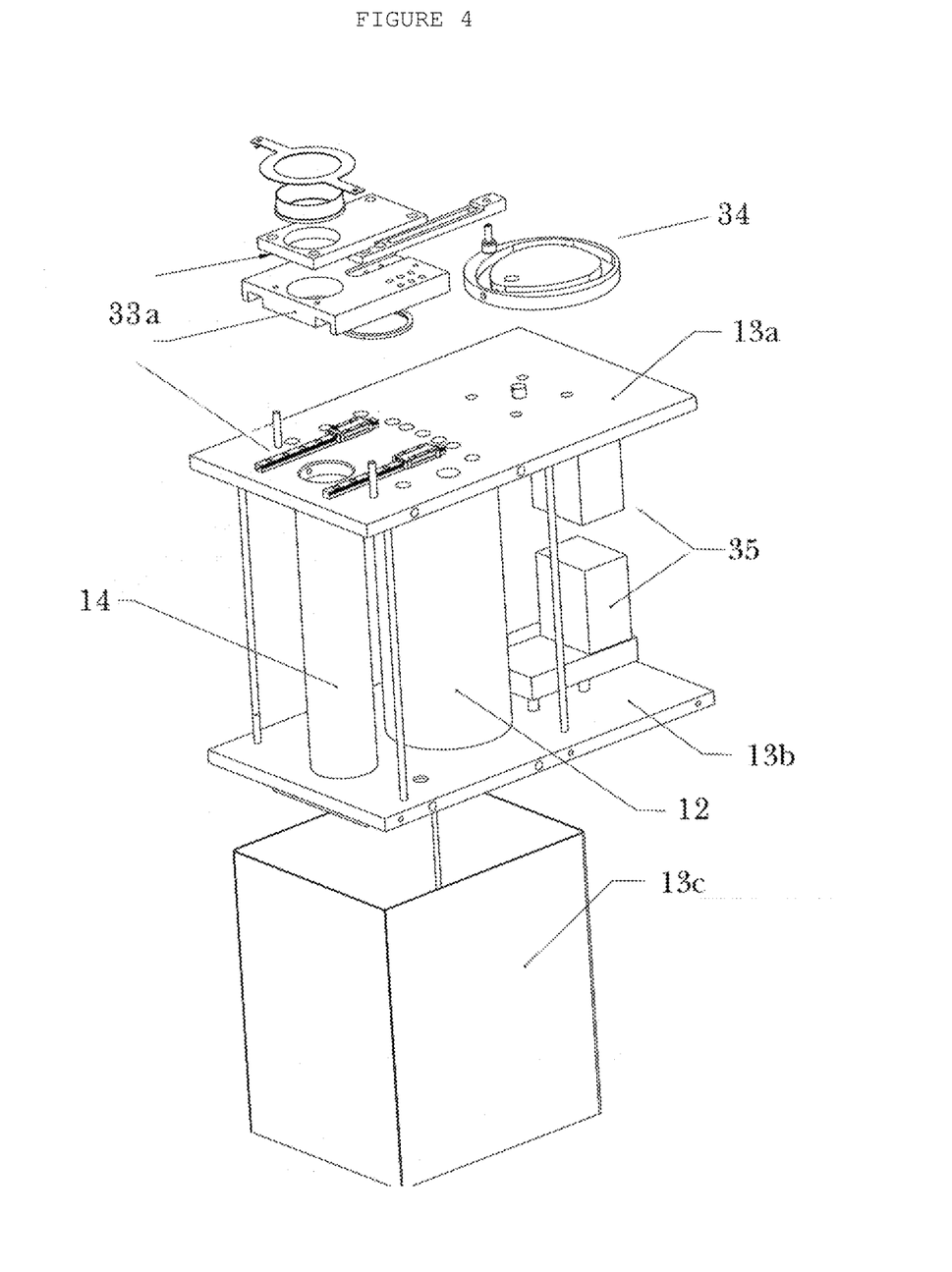

The cooking chamber is mounted in close proximity to, but independent of the boiler 12, and connected thereto by the boiler to high pressure temperature pump conduit 108 through which pressurized superheated water flows from the boiler 12 to the cook chamber 14. The boiler 12 and cook chamber 14 are not sized identically, with the boiler 12 being larger than the cook chamber 14. Water flow to the cook chamber 14 is enabled or disabled by an electrically powered cook chamber inlet solenoid valve 47 and the cook chamber 14 operating pressure is increased to predetermined operating pressures and regulated by energizing the high pressure temperature pump 38. The cook chamber inlet solenoid valve 47 is mounted onto the cook chamber inlet conduit 110 that connects the cook chamber 14 to the high pressure temperature pump 38 discharge. The cook chamber 14 is mounted to, sealed to, and penetrates the cooking assembly top plate 13a and the cooking assembly bottom plate 13b. Uncooked food enters the cook chamber 14 from the raw food ingress staging aperture 62 through the upper slide plate valve assembly 33a mounted onto the exterior surface of the cooking assembly top plate 13a. After a predetermined, user-programmable time period, cooked food exits the cook chamber 14 when the lower slide plate valve assembly 33b, mounted to the exterior surface of the cooking assembly bottom plate 13b opens.

In order to insure that design temperatures are maintained within the cook chamber 14 at the predetermined operating range throughout the entire cooking cycle and to increase boiler 12 heating efficiency, the cook chamber 14 and the boiler 12 are sealed within the cooking assembly 10. The cooking assembly 10 includes the cooking assembly enclosure 13c, which is mechanically attached to and sealed to the cooking assembly top plate 13a and the cooking assembly bottom plate 13b. The enclosure assembly is rendered liquid tight. The top and bottom plates also act as the end plates to the boiler 12 and cook chamber 14 to which the boiler 12 and cook chamber 14 are mechanically fastened to and sealed to. The cooking assembly 10 contains the heat transfer fluid 18. The heat transfer fluid 18 is heated by one or multiple heating element 16 to a predetermined temperature and surrounds the outer vertical walls of the boiler 12 and cook chamber 14.

The use of heat transfer fluid 18 reduces the time necessary to heat water contained within the boiler 12, and provides the heat necessary to maintain the cook chamber 14 and the superheated water within the cook chamber 14 at design temperature. This eliminates the need for a powered heat source within the cook chamber 14. Each heating element 16 contains a temperature sensor that detects the surface temperature of the element and regulates the heating element 16 output are interconnected for maintaining the pre-selected temperature of the water within the boiler 12. Some heating elements are electrically interconnected and one sensor may regulate multiple heating elements.

The heat transfer fluid 18 provides all supplemental heat to the cook chamber 14 and improves energy efficiency by providing an increased heat transfer surface contact area. The fluid also functions as a heat reservoir, thereby reducing process temperature swings. An air space maintained in the cooking assembly 10 allows for heat transfer fluid 18 thermal expansion. The cooking assembly top plate 13a and cooking assembly bottom plate 13b are ported for fluid transfers from within to without and machined for the attachment of process components such as heating elements, temperature probes, fluid conduits, and fasteners. Fluids that will traverse the porting in the plates include water, hot water, superheated water, air, water vapor, and steam.

The entire cooking assembly 10 is isolated and wrapped in insulation 20 to reduce radiant, conductive and convective heat losses. Insulators are installed where practical to separate the enclosure from applicable mounting apparatus and further reduce conductive heat losses.

Upon start-up, the heating elements located within the heat transfer fluid 18 are energized and supply water 1 enters the boiler 12. When the heat transfer fluid 18 temperature has reached its predetermined set-point, the supply water 1 pressure pump 5 is energized to boost boiler 12 pressures to a minimum preset pressure. Once the boiler 12 is pressurized, the boiler 12 heating element 16 is energized. Only when boiler 12 minimum pressure and temperature set-points are reached will the machine control circuit be energized, enabling the automatic sequential operation of the process controlled machine.

Once the machine control circuit is activated, the lower slide plate valve assembly 33b is actuated by the lower slide plate valve assembly drive mechanism 35b. The lower slide plate valve assembly 33b is rigidly attached to the underside of the cooking assembly bottom plate 13b through which cooked food can exit from the cook chamber 14. During start-up the lower slide plate valve assembly 33b is returned to its closed position, sealing the bottom to the cook chamber 14 prior to the upper slide plate valve assembly 33a being opened and enabling entry of the uncooked food into the cook chamber 14 from the raw food ingress staging aperture 62 and its retention within the cook chamber 14.

After the pre-measured portion of uncooked food enters the cook chamber 14, the upper slide plate valve assembly 33a is mechanically engaged and closed, sealing the cook chamber 14. With both valves in their closed position, the cook chamber inlet solenoid valve 47 is opened and the cook chamber 14 is charged with superheated water under pressure from the boiler 12. To boost cook chamber 14 pressure to the designated cooking pressure, a high pressure, high temperature rated electrically powered positive displacement pump is actuated. The high pressure temperature pump 38 boosts the superheated water pressure in the cook chamber 14 to a process pressure ranging from 23 to 34 atmospheres (340 to 500 psi), depending on the wall thickness, density, and fragility of the food-stuff to be cooked. Cook time for dry-goods such as pasta can range from less than a minute to about 4-minutes based on temperature and pressure set-points.

Temperature and pressure are monitored and controlled. A temperature probe 19 to detect fluid temperature is immersed into both the heat transfer fluid 18 and the boiler 12. A first pressure transducer 70 and a second pressure transducer 72 are fluidly interconnected to the cook chamber 14 to sense and control cooking pressure. The pressure transducers are mounted to rinse conduit 1 104 and rinse conduit 2 106. Rinse conduit 1 104 and rinse conduit 2 106 connects the pressure pump 5 discharge to the cook chamber 14 bottom plate.

Heating elements inserted in the heat transfer fluid 18 contain surface temperature regulating controls and maintain the heating element 16 at a near-constant temperature. The heat transfer element provides precise heating of the heat transfer fluid 18, the cook chamber 14, the boiler 12, and supplements any make up heat necessary to replace heat lost through the peripheral enclosure of the cooking assembly 10 and mounting apparatus.

The immersed temperature probes are connected electronically to a process control circuit, which in turns using solid state relays, modulates the power from a power source to the heating element 16. Heating elements within the boiler 12 and within the cooking assembly 10 heat transfer fluid 18 are energized to raise and maintain fluid temperatures to predetermined set-points. The heating element 16 contains built-in temperature regulation that limits the high temperature of each element so as not to allow a heating element 16 to overheat the surface of each element beyond a pre-set temperature. This prevents charring of the heat transfer fluid 18, extending the fluids and heating element's useful life.

Pressure transducers are electronically connected to the high pressure temperature pump 38 process control circuit. The process control circuit energizes the pump relay and the high pressure temperature pump 38 operates and builds pressure to a predetermined set-point. When pressure within the cook chamber 14 drops, the second pressure transducer 72 senses that pressure within the cook chamber 14 has fallen below the minimum pressure set-point. The process control circuit interprets the analogue signal from the pressure transducer energizes the high pressure temperature pump 38 electrical circuit which activates the high pressure temperature pump 38 to build pressure.

When the high pressure temperature pump 38 is activated to boost cook chamber 14 pressure, the boiler 12 heating element 16 is de-energized and the pressure control circuit of the boiler 12 pressure pump 5 is energized. The pressure pump 5 operates until the boiler 12 pressure reaches the pre-set maximum pressure and the low temperature pressure switch 31 is triggered. This is to maintain a minimum operating pressure within the boiler 12. Once boiler 12 pressures have reached a pre-set value, the boiler 12 heating element 16 is re-energized and the pressure pump 5 is disabled.

When pressure within the cook chamber 14 has reached a pre-set pressure, the first pressure transducer 70 signals the process control circuit to de-energize the high pressure temperature pump 38 control circuit, de-activating the pump control power relay that supplies power to the high pressure temperature pump 38.

Once food product within the cook chamber 14 has been sufficiently subjected to the superheated water for the operator selected time period, the process control circuit de-energizes the cook chamber inlet solenoid valve 47, enabling it to close. The cook chamber inlet solenoid valve 47 is located on the cook chamber inlet conduit 110 on the discharge side of the high pressure temperature pump 38. To depressurize the cook chamber 14, both the first venting solenoid valve 56, and the second venting solenoid valve 58, which are mechanically and fluidly connected to the inlet side of the cook chamber 14 open. The superheated water within the cook chamber 14 depressurizes and flashes to steam as it exits the cook chamber 14. The escaping steam is vented into the drain pan 64, where the steam mixes with cooler air, residual rinse water and condenses. Vented steam is ported from the cook chamber 14, through the two venting solenoid valves and to the drain pan 64 through 2 venting conduits. Venting conduit 1 112 and venting conduit 2 114 fluidly connect the cook chamber 14 to the drain pan 64. The vented steam condensate subsequently exits the drain pan 64 through the drain conduit 86.

After a predetermined period of time, the cook chamber 14 venting solenoid valves are closed and the cook chamber 14, rinse solenoid valve 8 is actuated. The cook chamber 14 is then charged with unheated water to cool the cooked food and halt secondary cooking, to rinse the cooked food-stuff to remove starch, and aid product discharge from the cook chamber 14. Rinse water pressure in the cooking chamber is limited to 3 atmospheres during rinsing and then reduced to about 0.5 atmospheres prior to product discharge. The slightly pressurized water in the cooking chamber together with the cooked food-stuff exits the cook chamber 14 into the drain pan 64 area through the opened lower slide plate valve and is collected into a strainer 63, separating the remaining water from the cooked product.

Design criteria are based on NEMA and GMP standards as warranted, and constructed of materials that resist corrosion, thermal degradation and are capable of performing reliably at design conditions and the working environment. Food contact surfaces are made from materials considered food safe and designed for easy clean up and for maintaining sanitary operation. Heating elements are selected and sized to heat and maintain the process temperatures to design criteria, without impeding pre-set time parameters programmable into the process controller. The heating elements located within the cooking assembly 10 and the boiler 12 are in intimate contact with the fluids and are selected for material compatibility and reliability. Heating elements also contain internal temperature limiters that prevent the surface temperature of the heating elements from exceeding pre-programmed set-points. The entire cooking assembly 10 is insulated with a high efficiency, non-thermally conductive material to reduce heat loss and operating cost.

Figure 2:
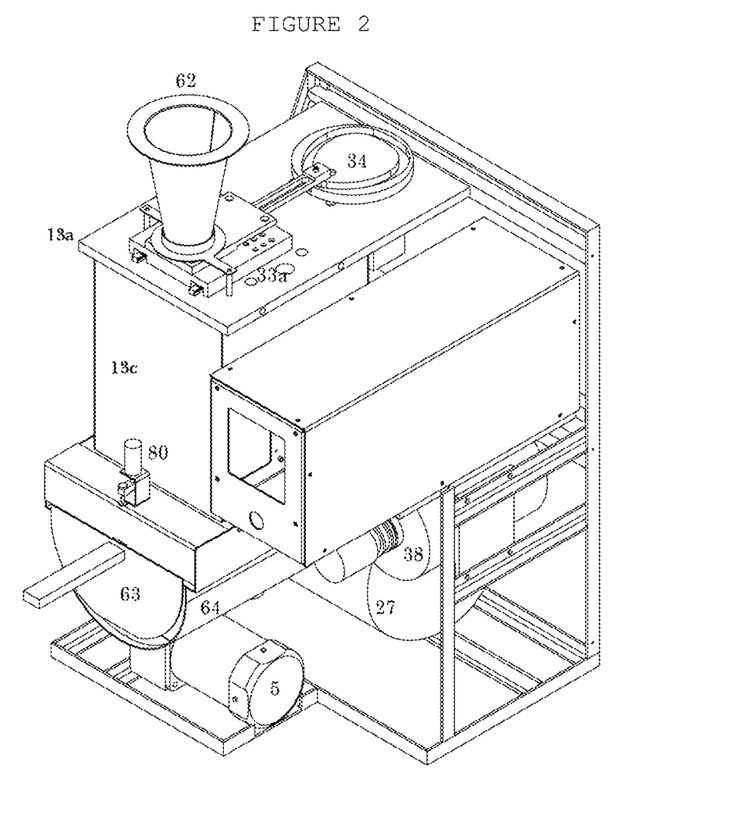

Process safety devices include fail-safe redundancy such as a high temperature pressure switch 30, pressure relief valves on the pumps and the expansion tank 27, a second venting solenoid valve 58 on the cook chamber 14, and failure mode process temperature sensors that interrupt control power, shutting down the machine should a heating element 16 solid state relay fail. Upon emergency shutdown all valves fail closed. Start-up programming provides for a safe sequence with immediate sequence interruption should operator safety interlocks be disengaged. Operator safety interlocks include a strainer interlock 80 and a strainer sensor 82 which verify the proper installation of the strainer 63 in order seal off the drain pan 64 and prevent exposing the operator to hot fluids and surfaces, as well as the lower slide plate valve assembly 33b moving parts. A second operator safety interlock is the raw food ingress staging aperture sensor 84 which isolates the operator from the upper slide plate valve assembly 33a.

All pumps, venting solenoid valves, mechanically actuated slide plate valves, motors, and control elements are electrically driven. All elements of the operation including sequence of operation, time-delays, counting functions, and other programmable operations that are engaged and controlled by the process control circuit. Limited end-user/operator interaction is available through a keypad/touch screen interface. Program operation and control are internal to the machine using the process control circuit. Using control elements and sensors, the factory programmed process control circuit provides automatic timed, temperature, pressure and sequence control of the various operations and components of the fast-cook machine. The machine is energized by external standard line voltage.

The machine is electrically energized by manually activating a switch or can be activated remotely with optional hardware. Once the process control circuit is energized, a virtual on/off switch is displayed on the touch screen, from which the machine can be started and begin the heating of the heat transfer fluid 18 within the cooking assembly 10. The process control circuit can be electronically slaved to another device such as vending equipment or a cash register. This screen also enables the user to selectively clean, sterilize and shutdown the equipment.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A machine to fast cook raw food stuff including dry-goods such as pasta on demand for the vending, fast-food, hospitality, restaurant and related commercial markets, comprising:

a raw food-stuff ingress staging aperture for staging a pre-measured portion of uncooked food, and isolating moving parts from the operator, said raw food-stuff ingress staging aperture being functionally and insertably coupled to an upper slide plate valve assembly;

a cooking assembly for heating water and cooking raw food-stuff, and being an assembly of a boiler, a cooking assembly top plate, a cooking assembly bottom plate, a cooking assembly enclosure and a cook chamber;

said cooking assembly top plate for sealing the top of said cooking assembly enclosure, said cooking assembly top plate being part of said cooking assembly;

said cooking assembly bottom plate for sealing the bottom of said cooking assembly enclosure, said cooking assembly bottom plate being part of said cooking assembly;

said cooking assembly enclosure for enclosing and creating a volume by mechanically attaching and sealing to said cooking assembly top plate and said cooking assembly bottom plate, said cooking assembly enclosure being part of said cooking assembly;

a heat transfer fluid fluidly contained by said cooking assembly, thermally encompassing said boiler, said cook chamber, and heating elements for the absorption, storage, and efficient transfer of thermal energy from said heating elements to said boiler and said cook chamber;

said boiler for containing and heating a volume of water under pressure to a superheated state on demand, said boiler being part of the cooking assembly;

said cook chamber for containing a pre-determined portion of food stuff and superheated water at sufficient pressure and temperature to promote hydration and cooking, said cook chamber being part of the cooking assembly;

said heating element for heating water and said heat transfer fluid while said heating element's external surface temperature is self-regulated to not exceed process defined set-points;

an expansion tank for providing a variable pressurized volume to accommodate increases in fluid volume due to thermal expansion, fluidly connected to said boiler;

a pressure pump for boosting supply water pressure within said boiler, fluidly connected to said boiler, and fluidly connected to a rinse solenoid valve;

a high pressure temperature pump for boosting pressure of superheated water within said cook chamber, fluidly connected to said boiler, and fluidly connected to said cook chamber;

a first pressure transducer for detecting and accurately measuring process pressures and generating an output signal, fluidly connected to said cook chamber;

a second pressure transducer for detecting and measuring process pressures and generating an output signal, fluidly connected to said cook chamber;

a high temperature pressure switch for detecting pressure at said cook chamber and at a pre-set pressure actuates an electrical circuit, fluidly connected to said cook chamber, and functionally connected to said high pressure temperature pump;

a low temperature pressure switch for detecting process pressure at said boiler and at a pre-set minimum pressure closes an electrical circuit, fluidly connected to said boiler, and functionally connected to said pressure pump;

a cook chamber inlet solenoid valve for filling and pressurization said cook chamber by enabling and disabling the flow of superheated water through said cook chamber inlet conduit, fluidly connected to said cook chamber, and fluidly connected to said boiler;

a first venting solenoid valve for controlled depressurization of said cook chamber, fluidly connected to said cook chamber, and fluidly connected to a drain pan;

a second venting solenoid valve for controlled depressurization of said cook chamber, fluidly connected to said cook chamber, and fluidly connected to said drain pan;

said rinse solenoid valve for supplying rinse water to said cook chamber, fluidly connected to said cook chamber, and fluidly connected to said pressure pump;

said upper slide plate valve assembly for sealing and unsealing the inlet of said cook chamber, upwardly and rigidly connected to said cooking assembly top plate, being functionally and insertably coupled to said raw food-stuff ingress staging aperture;

a lower slide plate valve assembly for sealing and unsealing the discharge end of said cook chamber, downwardly and rigidly connected to said cooking assembly bottom plate;

said drain pan for accumulation, isolation and removal of hot rinse water, flashed steam, and cooked food-stuff, downwardly and rigidly connected to said cooking assembly bottom plate;

a strainer for capturing, collecting, and draining cooked food-stuff, supportively captured by said drain pan; and a strainer interlock for preventing the accidental or unscheduled removal of said strainer from said drain pan, temporarily retained to said strainer.

2. The machine to fast cook raw food stuff including dry-goods such as pasta on demand in accordance with claim 1, wherein said raw food-stuff ingress staging apparatus for staging a pre-measured portion of uncooked food directly above said cook chamber, isolating moving parts from the operator, being functionally and insertably coupled to said cooking assembly upper slide plate valve assembly, and comprises a machine washable, easy to remove and reinstall, easy to load, self-emptying, corrosion resistant raw food ingress staging aperture.

3. The machine to fast cook raw food stuff including dry-goods such as pasta on demand in accordance with claim 1, wherein said cooking assembly for heating water, cooking raw food-stuff, containment for said heat transfer fluid, said heating elements, temperature probes, said boiler and said cook chamber, being an assembly of said boiler, said cooking assembly top plate, said cooking assembly bottom plate, said cooking assembly enclosure, said cook chamber, and comprises a sealable, liquid tight, process pressure resistant, process temperature resistant, corrosion resistant, materially inert cooking assembly.

4. The machine to fast cook raw food stuff including dry-goods such as pasta on demand in accordance with claim 1, wherein said cooking assembly top plate for sealing the top of said cooking assembly enclosure, said boiler and said cook chamber to thermally and volumetrically contain said boiler, said cook chamber, and said heat transfer fluid, provides for penetrations into said boiler and said cooking chamber for entry and vacating of water, vapor, and food stuffs, and for mounting and attachment of components, and comprises a liquid tight, process pressure resistant, process temperature resistant, corrosion resistant, sealable to said enclosure, said boiler and said cook chamber cooking assembly top plate.

5. The machine to fast cook raw food stuff including dry-goods such as pasta on demand in accordance with claim 1, wherein said cooking assembly bottom plate for sealing the bottom of said cooking assembly enclosure, said boiler and said cook chamber to thermally and volumetrically contain said boiler, said cook chamber, and said heat transfer fluid, provides for penetrations into said boiler and said cook chamber for entry and vacating of water, vapor, and food-stuffs, and for mounting and attachment of components, and comprises a liquid tight, process pressure resistant, process temperature resistant, corrosion resistant, sealable to said enclosure, said boiler, and said cook chamber cooking assembly bottom plate.

6. The machine to fast cook raw food stuff including dry-goods such as pasta on demand in accordance with claim 1, wherein said cooking assembly enclosure for enclosing and creating a volume by mechanically attaching and sealing to said cooking assembly top plate and said cooking assembly bottom plate, providing for the thermal and volumetric containment of said boiler, said cook chamber, said heat transfer fluid, said heating elements, and temperature probes, and comprises a sealable, liquid tight, process temperature resistant, corrosion resistant, cooking assembly enclosure.

7. The machine to fast cook raw food stuff including dry-goods such as pasta on demand in accordance with claim 1, wherein said heat transfer fluid for the absorption, storage, and efficient transfer of thermal energy from said heating elements to said boiler and said cook chamber, and comprises a thermally conductive, thermally stable, liquid, oxidation resistant, non-corrosive, with efficient heat capacity heat transfer fluid.

8. The machine to fast cook raw food stuff including dry-goods such as pasta on demand in accordance with claim 1, wherein said boiler for containing and heating a volume of water under pressure to a superheated state on demand, and comprises a sealable, pressurizable, process pressure resistant, process temperature resistant, thermally conductive, corrosion resistant boiler.

9. The machine to fast cook raw food stuff including dry-goods such as pasta on demand in accordance with claim 1, wherein said cook chamber for containing a pre-determined portion of food stuff and superheated water at sufficient pressure and temperature to promote hydration and cooking, and comprises a sealable, pressurizable, easy to clean, process pressure resistant, process temperature resistant, thermally conductive, corrosion resistant cook chamber.

10. The machine to fast cook raw food stuff including dry-goods such as pasta on demand in accordance with claim 1, wherein said heating elements for heating water and said heat transfer fluid while said heating element's external surface temperature is self-regulated to not exceed process defined set-points, and comprises a heat generating, high energy output, process pressure resistant, process temperature resistant, electrically powered, skin temperature controllable, corrosion resistant heating element.

11. The machine to fast cook raw food stuff including dry-goods such as pasta on demand in accordance with claim 1, wherein said expansion tank for providing a variable pressurized volume to accommodate increases in fluid volume due to thermal expansion, preventing over-pressurization of fluidly interconnected components, increasing operator safety, and comprises a rigidly encapsulated, self-emptying, process pressure resistant, process temperature resistant, corrosion resistant expansion tank.

12. The machine to fast cook raw food stuff including dry-goods such as pasta on demand in accordance with claim 1, wherein said pressure pump for boosting supply water pressure within said boiler to the minimum preset pressure necessary for the controlled generation of superheated water, and comprises a fluid flow generating, pressure generating, process pressure resistant, corrosion resistant, electrically driven pressure pump.

13. The machine to fast cook raw food stuff including dry-goods such as pasta on demand in accordance with claim 1, wherein said high pressure temperature pump for increasing pressure of superheated water within the cook chamber to predetermined elevated process pressures in order to promote high-speed cooking, preventing the flashing of superheated water to steam, and comprises a fluid flow generating, pressure generating, process pressure resistant, process temperature resistant, corrosion resistant, electrically driven high pressure temperature pump.

14. The machine to fast cook raw food stuff including dry-goods such as pasta on demand in accordance with claim 1, wherein said first pressure transducer for detecting and accurately measuring process pressures and generating an output signal detectable and measurable to a process control circuit in order to de-energize said high pressure temperature pump when a predetermined maximum pressure set-point is reached, and comprises an analog pressure measuring, signal generating, set-point adjustable, process pressure resistant, process temperature resistant, corrosion resistant first pressure transducer.

15. The machine to fast cook raw food stuff including dry-goods such as pasta on demand in accordance with claim 1, wherein said second pressure transducer for detecting and measuring process pressures and generating an output signal detectable and measurable to a process control circuit in order to energize said high pressure temperature pump when the measured pressure has dropped to a predetermined minimum set-point, and comprises an analog pressure measuring, signal generating, set-point adjustable, process pressure resistant, process temperature resistant, corrosion resistant second pressure transducer.

16. The machine to fast cook raw food stuff including dry-goods such as pasta on demand in accordance with claim 1, wherein said high temperature pressure switch for detecting pressure and at a pre-set pressure actuates a circuit that can de-energize a power relay to de-activate said high pressure temperature pump and prevent over-pressurizing fluidly interconnected components, and comprises a pressure activated, set-point pressure adjustable, process pressure resistant, process temperature resistant, corrosion resistant, electrical contact containing high temperature pressure switch.

17. The machine to fast cook raw food stuff including dry-goods such as pasta on demand in accordance with claim 1, wherein said low temperature pressure switch for detecting process pressure at said boiler and when a pre-set minimum pressure is reached, closes an electrical circuit, energizing the pressure pump power relay to activate said pressure pump, and comprises a pressure activated, set-point pressure adjustable, process pressure resistant, electrical contact containing, corrosion resistant low temperature pressure switch.

18. The machine to fast cook raw food stuff including dry-goods such as pasta on demand in accordance with claim 1, wherein said cook chamber inlet solenoid valve for filling and pressurization of said cook chamber by enabling and disabling the flow of superheated water to said cook chamber, and comprises a water and steam rated, high Cv, fluid transport enabling, process pressure resistant, process temperature resistant, corrosion resistant, electrically actuated cook chamber inlet solenoid valve.

19. The machine to fast cook raw food stuff including dry-goods such as pasta on demand in accordance with claim 1, wherein said first venting solenoid valve for controlled depressurization of said cook chamber by enabling access to venting conduit 1 fluidly connecting said cook chamber and said drain pan, enabling the release of pressurized superheated fluid, and comprises a water and steam rated, high Cv, fluid transport enabling, process pressure resistant, process temperature resistant, corrosion resistant, electrically actuated first venting solenoid valve.

20. The machine to fast cook raw food stuff including dry-goods such as pasta on demand in accordance with claim 1, wherein said second venting solenoid valve for controlled depressurization of said cook chamber by enabling access to venting conduit 2 fluidly connecting said cook chamber and said drain pan, enabling the release of pressurized superheated fluid, and comprises a water and steam rated, high Cv, fluid transport enabling, process pressure resistant, process temperature resistant, corrosion resistant, electrically actuated second venting solenoid valve.

21. The machine to fast cook raw food stuff including dry-goods such as pasta on demand in accordance with claim 1, wherein said rinse solenoid valve for supplying rinse water to said cook chamber by controlling access to the rinse conduits fluidly connecting said pressure pump to said cook chamber, and comprises a water rated, high Cv, fluid transport enabling, process pressure resistant, process temperature resistant, corrosion resistant, electrically actuated rinse solenoid valve.

22. The machine to fast cook raw food stuff including dry-goods such as pasta on demand in accordance with claim 1, wherein said upper slide plate valve assembly for sealing and unsealing the inlet of said cook chamber utilizing a plate mechanically actuated laterally across a temperature resistant seal, thereby opening and closing off food-stuff ingress into said cook chamber, and comprises a mechanically actuated, pressure sealable, high strength, compact, process pressure resistant, process temperature resistant, corrosion resistant upper slide plate valve assembly.

23. The machine to fast cook raw food stuff including dry-goods such as pasta on demand in accordance with claim 1, wherein said lower slide plate valve assembly for sealing and unsealing the discharge end of said cook chamber utilizing a plate mechanically actuated laterally across a temperature resistant seal, opening and closing off food-stuff egress from said cook chamber into said drain pan, and comprises a mechanically actuated, pressure sealable, high strength, compact, process pressure resistant, process temperature resistant, corrosion resistant lower slide plate valve assembly.

24. The machine to fast cook raw food stuff including dry-goods such as pasta on demand in accordance with claim 1, wherein said drain pan for accumulation, isolation and removal of hot rinse water, flashed steam, and cooked food-stuff as discharged from said cook chamber, and to house, support, and enable the easy removal and reinsertion of said strainer, and comprises a rigid, sealable, self-draining, of sufficient volume to contain cooked food and collection strainer, easy to clean, corrosion resistant drain pan.

25. The machine to fast cook raw food stuff including dry-goods such as pasta on demand in accordance with claim 1, wherein said strainer for capturing, collecting, and draining cooked food-stuff discharged from said cook chamber, and the quick separation of cooked food-stuff from rinse water, and comprises a removable, quick draining, process temperature resistant, easy to empty, easy to clean, corrosion resistant strainer, having sufficient capacity to capture all discharged food and a mesh size sufficient to capture all discharged food.

26. The machine to fast cook raw food stuff including dry-goods such as pasta on demand in accordance with claim 1, wherein said strainer interlock for preventing the accidental and unscheduled removal of said strainer from said drain pan in order to safely isolate said drain pan interior hot surfaces, and moving parts from the operator, and comprises a strainer retaining, water resistant, corrosion resistant, electrically actuated strainer interlock.

27. The machine to fast cook raw food stuff including dry-goods such as pasta on demand in accordance with claim 1, wherein said cooking assembly being an assembly of said boiler, said cooking assembly top plate, said cooking assembly bottom plate, said cooking assembly enclosure and said cook chamber, providing for containment of said heat transfer fluid, having penetrations and mounting surfaces for the insertion and attachment of said surface temperature self-regulating heating elements, having penetrations and mounting surfaces for the attachment of fluid couplings fluidly connecting said pressure pump, said high pressure temperature pump, said expansion tank, said first pressure transducer, said second pressure transducer, said high temperature pressure switch, said low temperature pressure switch, said cook chamber inlet solenoid valve, said rinse solenoid valve, said first venting solenoid valve, and second venting solenoid valve, and having penetrations and mounting surfaces for the attachment of said upper slide plate valve assembly, said lower slide plate valve assembly, and said drain pan.

28. A machine to fast cook raw food stuff including dry-goods such as pasta on demand for the vending, fast-food, hospitality, restaurant and related commercial markets, comprising:
   a machine washable, easy to remove and reinstall, easy to load, self-emptying, corrosion resistant raw food-stuff ingress staging aperture, for staging a pre-measured portion of uncooked food directly above said cook chamber, and isolating moving parts from the operator. The component is functionally and insertably coupled to said cooking assembly upper slide plate valve assembly and;
   a sealable, liquid tight, process pressure resistant, process temperature resistant, corrosion resistant, materially inert cooking assembly, for heating water and cooking raw food-stuff, providing containment for said heat transfer fluid, said heating elements, temperature probes, said boiler and said cook chamber, and being an assembly of said boiler, said cooking assembly top plate, said cooking assembly bottom plate, said cooking assembly enclosure, said cook chamber and;
   a liquid tight, process pressure resistant, process temperature resistant, corrosion resistant, sealable to said cooking assembly enclosure, said boiler and said cook chamber cooking assembly top plate, for sealing the top of said cooking assembly enclosure, said boiler and said cook chamber to thermally and volumetrically contain said boiler, said cook chamber, and said heat transfer fluid, providing for penetrations into said boiler and said cooking chamber for entry and vacating of water, vapor, and food stuffs, and for the mounting and attachment of components, said cooking assembly top plate being part of said cooking assembly;
   a liquid tight, process pressure resistant, process temperature resistant, corrosion resistant, sealable to said cooking assembly enclosure, said boiler and said cook chamber cooking assembly bottom plate, for sealing of the bottom of said cooking assembly enclosure, said boiler and said cook chamber to thermally and volumetrically contain said boiler, said cook chamber, and said heat transfer fluid, providing for penetrations into said boiler and said cook chamber for entry and vacating of water, vapor, and food-stuffs, and for the mounting and attachment of components, said cooking assembly bottom plate being part of said cooking assembly;
   a sealable, liquid tight, process temperature resistant, corrosion resistant cooking assembly enclosure, for enclosing and creating a volume by mechanically attaching and sealing to said cooking assembly top plate and cooking assembly bottom plate, providing for the thermal and volumetric containment of said boiler, said cook chamber, said heat transfer fluid, said heating elements, and temperature probes, sealably connected to said cooking assembly bottom plate, sealably connected to said cooking assembly top plate, said cooking assembly enclosure being part of said cooking assembly;
   a thermally conductive, thermally stable, liquid, oxidation resistant, non-corrosive, high heat capacity heat transfer fluid, for the absorption, storage, and efficient transfer of thermal energy from said heating elements to said boiler and said cook chamber, fluidly retained to said cooking assembly enclosure, fluidly retained to said cooking assembly bottom plate, fluidly retained to said cooking assembly top plate, fluidly contained by said cooking assembly, thermally encompassing said boiler, thermally encompassing said cook chamber, thermally encompassing said heating elements, and thermally encompassing to said temperature probe;
   a sealable, pressurizable, process pressure resistant, process temperature resistant, thermally conductive, corrosion resistant boiler, for containing and heating a volume of water under pressure to a superheated state on demand, thermally encompassed by said heat transfer fluid, rigidly connected to said cooking assembly top plate, rigidly connected to said cooking assembly bottom plate, and said boiler being part of said cooking assembly;
   a sealable, pressurizable, easy to clean, process pressure resistant, process temperature resistant, thermally conductive, corrosion resistant cook chamber, for containing a pre-determined portion of food stuff and superheated water at sufficient pressure and temperature to promote hydration and cooking, thermally encompassed by said heat transfer fluid, rigidly connected to said cooking assembly top plate, rigidly connected to said cooking assembly bottom plate, and said cook chamber being part of said cooking assembly;

a heat generating, high energy output, process pressure resistant, process temperature resistant, electrically powered, skin temperature controllable, corrosion resistant heating element, for heating water and heat transfer fluid while said heating element's external surface temperature is self-regulated to not exceed process defined set-points, rigidly connected to said cooking assembly top plate;

a rigidly encapsulated, self-emptying, process pressure resistant, process temperature resistant, corrosion resistant expansion tank, for providing a variable pressurized volume to accommodate increases in fluid volume due to thermal expansion, preventing over-pressurization of fluidly interconnected components, increasing operator safety, fluidly connected to said boiler;

a fluid flow generating, pressure generating, process pressure resistant, corrosion resistant, electrically driven pressure pump, for boosting supply water pressure within said boiler to the minimum preset pressure necessary for the controlled generation of superheated water, fluidly connected to said boiler, and fluidly connected to said rinse solenoid valve;

a fluid flow generating, pressure generating, process pressure resistant, process temperature resistant, corrosion resistant, electrically driven high pressure temperature pump, for pumping and boosting pressure of superheated water within said cook chamber to predetermined elevated process pressures in order to promote high-speed cooking and prevent the flashing of superheated water to steam, fluidly connected to said boiler, and fluidly connected to said cook chamber;

an analog pressure measuring, signal generating, set-point adjustable, process pressure resistant, process temperature resistant, corrosion resistant first pressure transducer, for detecting and accurately measuring process pressures and generating an output signal detectable and measurable to a process control circuit in order to de-energize said high pressure temperature pump when a predetermined maximum pressure set-point is reached, effectively connected to said high pressure temperature pump, and fluidly connected to said cook chamber;

an analog pressure measuring, signal generating, set-point adjustable, process pressure resistant, process temperature resistant, corrosion resistant second pressure transducer, for detecting and measuring process pressures and generating an output signal detectable and measurable to a process control circuit in order to energize said high pressure temperature pump when the measured pressure has dropped to a predetermined minimum set-point, effectively connected to said high pressure temperature pump, and fluidly connected to said cook chamber;

a pressure activated, set-point pressure adjustable, process pressure resistant, process temperature resistant, corrosion resistant, electrical contact containing high temperature pressure switch, for detecting pressure and at a pre-set pressure actuates a circuit that can de-energize a power relay to de-activate said high pressure temperature pump and prevent over-pressurizing fluidly interconnected components, effectively connected to said high pressure temperature pump, and fluidly connected to said cook chamber;

a pressure activated, set-point pressure adjustable, process pressure resistant, electrical contact containing, corrosion resistant low temperature pressure switch, for detecting process pressure at said boiler and when a pre-set minimum pressure is reached, closes an electrical circuit, energizing the pressure pump power relay to activate said pressure pump, effectively connected to said pressure pump, and fluidly connected to said boiler;

a water and steam rated, high Cv, fluid transport enabling, process pressure resistant, process temperature resistant, corrosion resistant, electrically actuated cook chamber inlet solenoid valve, for filling and pressurization of said cook chamber by enabling and disabling the flow of superheated water through the cook chamber inlet conduit, fluidly connected to said high pressure temperature pump, fluidly connected to said cook chamber, and fluidly connected to said boiler;

a water and steam rated, high Cv, fluid transport enabling, process pressure resistant, process temperature resistant, corrosion resistant, electrically actuated first venting solenoid valve, for depressurization of said cook chamber by controlling access to venting conduit 1 enabling the release of pressurized superheated fluid, fluidly connected to said cook chamber, and fluidly connected to said drain pan;

a water and steam rated, high Cv, fluid transport enabling, process pressure resistant, process temperature resistant, corrosion resistant, electrically actuated second venting solenoid valve, for depressurization of said cook chamber by controlling access to venting conduit 2 enabling the release of pressurized superheated fluid, fluidly connected to said cook chamber, and fluidly connected to said drain pan;

a water rated, high Cv, fluid transport enabling, process pressure resistant, process temperature resistant, corrosion resistant, electrically actuated rinse solenoid valve, for supplying rinse water to said cook chamber by controlling access to the rinse conduits fluidly connecting said pressure pump to said cook chamber, fluidly connected to said pressure pump, and fluidly connected to said cook chamber;

a mechanically actuated, pressure sealable, high strength, compact, process pressure resistant, process temperature resistant, corrosion resistant upper slide plate valve assembly, for sealing and unsealing the inlet of said cook chamber utilizing a plate mechanically actuated laterally across a temperature resistant seal, thereby opening and closing off food-stuff ingress into said cook chamber, upwardly connected to said cook chamber, rigidly connected to said cooking assembly top plate, and functionally and insertably coupled to said raw food-stuff ingress staging aperture;

a mechanically actuated, pressure sealable, high strength, compact, process pressure resistant, process temperature resistant, corrosion resistant lower slide plate valve assembly, for sealing and unsealing the discharge end of said cook chamber utilizing a plate mechanically actuated laterally across a temperature resistant seal, opening and closing off food-stuff egress from said cook chamber into said drain pan, downwardly connected to said cook chamber, and rigidly connected to said cooking assembly bottom plate;

a rigid, sealable, self-draining, of sufficient volume to contain cooked food and strainer, easy to clean, corrosion resistant drain pan, for accumulation, isolation and removal of hot rinse water, flashed steam, and cooked food-stuff as discharged from said cook chamber, and to house, support, and enable the easy removal and reinsertion of said strainer, downwardly housed to said lower slide plate valve assembly, rigidly connected to said cooking assembly bottom plate, fluidly connected to said first venting solenoid valve, fluidly connected to said second venting solenoid valve, and functionally connected to said lower slide plate valve assembly;

a removable, quick draining, process temperature resistant, easy to empty, easy to clean, corrosion resistant strainer, having sufficient capacity to capture all discharged food and a mesh size sufficient to capture all discharged food, for capturing, collecting, and draining cooked food-stuff discharged from said cook chamber and the quick separation of cooked food-stuff from rinse water, supportively captured by said drain pan, and functionally connected to said lower slide plate valve assembly; and a strainer retaining, water resistant, corrosion resistant, electrically actuated strainer interlock, for preventing the accidental and unscheduled removal of said strainer from said drain pan in order to safely isolate the drain pan interior hot surfaces, and moving parts from the operator, temporarily retained to said strainer.

29. A machine to fast cook raw food stuff comprising:

a raw food-stuff ingress staging aperture for the containment and guiding of raw food stuff into said cook chamber;

a cooking assembly, providing containment for said heat transfer fluid, said heating elements, temperature probes, said boiler, and said cook chamber, and being an assembly of said cooking assembly top plate, said cooking assembly bottom plate, said cooking assembly enclosure, said boiler, and said cook chamber;

a cooking assembly top plate, attached to said cooking assembly enclosure, said boiler and said cook chamber for the containment of said heat transfer fluid, and the attachment of said heating elements, temperature probes, an upper slide plate valve assembly, and fluid conduits;

a cooking assembly bottom plate, attached to said cooking assembly enclosure, said boiler and said cook chamber for the containment of said heat transfer fluid, and the attachment of said heating elements, temperature probes, a lower slide plate valve assembly, and fluid conduits;

a cooking assembly enclosure, for enclosing and creating a volume by mechanically attaching and sealing to said cooking assembly top plate and cooking assembly bottom plate, providing for the thermal and volumetric containment of said boiler, said cook chamber, said heat transfer fluid, said heating elements, and temperature probes;

a heat transfer fluid, for the absorption, storage, and efficient transfer of thermal energy from said heating elements to said boiler and said cook chamber;

a boiler, for containing and heating a volume of water under pressure to a superheated state on demand;

a cook chamber, for containing a pre-determined portion of food stuff and superheated water at sufficient pressure and temperature to promote hydration and cooking;

a heating element, with said heating element's external surface temperature being self-regulated to not exceed process defined set-points, for heating water and heat transfer fluid;

an expansion tank, for providing a variable pressurized volume to accommodate increases in fluid volume due to thermal expansion, preventing over-pressurization of fluidly interconnected components, increasing operator safety;

a pressure pump, for boosting supply water pressure within said boiler to the minimum preset pressure necessary for the controlled generation of superheated water;

a high pressure temperature pump, for pumping and boosting pressure of superheated water within said cook chamber to promote high-speed cooking and prevent the flashing of superheated water to steam;

a first pressure transducer, for detecting and accurately measuring process pressures and generating an output signal detectable and measurable to a process control circuit in order to de-energize said high pressure temperature pump when a predetermined maximum pressure set-point is reached;

a second pressure transducer, for detecting and measuring process pressures and generating an output signal detectable and measurable to a process control circuit in order to energize said high pressure temperature pump when the measured pressure has dropped to a predetermined minimum set-point;

a high temperature pressure switch, for detecting pressure, and at a pre-set pressure actuates a circuit that can de-energize said high pressure temperature pump, preventing over-pressurizing fluidly interconnected components;

a low temperature pressure switch, for detecting process pressure at said boiler, and when a pre-set minimum pressure is reached, closes an electrical circuit, energizing said pressure pump;

a cook chamber inlet solenoid valve, for filling and pressurization of said cook chamber by enabling and disabling the flow of superheated water through the cook chamber inlet conduit;

a first venting solenoid valve, for depressurization of said cook chamber by controlling access to venting conduit 1, and enabling the release of pressurized superheated fluid;

a second venting solenoid valve, for depressurization of said cook chamber by controlling access to venting conduit 2, and enabling the release of pressurized superheated fluid;

a rinse solenoid valve, for supplying rinse water to said cook chamber by controlling access to the rinse conduits fluidly connecting said pressure pump to said cook chamber;

an upper slide plate valve assembly, for sealing and unsealing the inlet of said cook chamber utilizing a plate mechanically actuated laterally across a temperature resistant seal, thereby opening and closing off food-stuff ingress into said cook chamber;

a lower slide plate valve assembly, for sealing and unsealing the discharge end of said cook chamber utilizing a plate mechanically actuated laterally across a temperature resistant seal, thereby opening and closing off food-stuff egress from said cook chamber into said drain pan;

a drain pan, for accumulation, isolation and removal of hot rinse water, flashed steam, and cooked food-stuff as discharged from said cook chamber, and to house, support, and enable the easy removal and reinsertion of said strainer;

a strainer, having sufficient capacity to capture all discharged food and a mesh size sufficient to capture all discharged food, for capturing, collecting, and draining cooked food-stuff discharged from said cook chamber and the quick separation of cooked food-stuff from rinse water; and a strainer interlock, for preventing the accidental and unscheduled removal of said strainer from said drain pan, and to safely isolate said drain pan interior hot surfaces, and moving parts from the operator.

30. A machine to fast cook raw food stuff comprising:

a raw food-stuff ingress staging aperture for the containment and guiding of raw food stuff into said cook chamber;

a cooking assembly, providing containment for said heat transfer fluid, said heating elements, temperature probes, said boiler, and said cook chamber, and being an assembly of said cooking assembly top plate, said cooking assembly bottom plate, said cooking assembly enclosure, said boiler, and said cook chamber;

a cooking assembly top plate, attached to said cooking assembly enclosure, said boiler and said cook chamber for the containment of said heat transfer fluid, and the attachment of said heating elements, temperature probes, an upper slide plate valve assembly, and fluid conduits;

a cooking assembly bottom plate, attached to said cooking assembly enclosure, said boiler and said cook chamber for the containment of said heat transfer fluid, and the attachment of said heating elements, temperature probes, a lower slide plate valve assembly, and fluid conduits;

a cooking assembly enclosure, for enclosing and creating a volume by mechanically attaching and sealing to said cooking assembly top plate and cooking assembly bottom plate, providing for the thermal and volumetric containment of said boiler, said cook chamber, said heat transfer fluid, said heating elements, and temperature probes;

a heat transfer fluid, for the absorption, storage, and efficient transfer of thermal energy from said heating elements to said boiler and said cook chamber;

a boiler, for containing and heating a volume of water under pressure to a superheated state on demand;

a cook chamber, for containing a pre-determined portion of food stuff and superheated water at sufficient pressure and temperature to promote hydration and cooking;

a heating element, with said heating element's external surface temperature being self-regulated to not exceed process defined set-points, for heating water and heat transfer fluid;

an expansion tank, for providing a variable pressurized volume to accommodate increases in fluid volume due to thermal expansion, preventing over-pressurization of fluidly interconnected components, increasing operator safety;

a high pressure pump for pumping and boosting pressure of superheated water within said boiler and said cook chamber to promote high-speed cooking and prevent the flashing of superheated water to steam;

a first pressure transducer, for detecting and accurately measuring process pressures and generating an output signal detectable and measurable to a process control circuit in order to de-energize said high pressure temperature pump when a predetermined maximum pressure set-point is reached;

a second pressure transducer, for detecting and measuring process pressures and generating an output signal detectable and measurable to a process control circuit in order to energize said high pressure temperature pump when the measured pressure has dropped to a predetermined minimum set-point;

a high temperature pressure switch, for detecting pressure, and at a pre-set pressure actuates a circuit that can de-energize said high pressure temperature pump, preventing over-pressurizing fluidly interconnected components;

a low temperature pressure switch, for detecting process pressure at said boiler, and when a pre-set minimum pressure is reached, closes an electrical circuit, energizing said pressure pump;

a cook chamber inlet solenoid valve, for filling and pressurization of said cook chamber by enabling and disabling the flow of superheated water through the cook chamber inlet conduit;

a first venting solenoid valve, for depressurization of said cook chamber by controlling access to venting conduit 1, and enabling the release of pressurized superheated fluid;

a second venting solenoid valve, for depressurization of said cook chamber by controlling access to venting conduit 2, and enabling the release of pressurized superheated fluid;

a rinse solenoid valve, for supplying rinse water to said cook chamber by controlling access to the rinse conduits fluidly connecting said pressure pump to said cook chamber;

an upper slide plate valve assembly, for sealing and unsealing the inlet of said cook chamber utilizing a plate mechanically actuated laterally across a temperature resistant seal, thereby opening and closing off food-stuff ingress into said cook chamber;

a lower slide plate valve assembly, for sealing and unsealing the discharge end of said cook chamber utilizing a plate mechanically actuated laterally across a temperature resistant seal, thereby opening and closing off food-stuff egress from said cook chamber into said drain pan;

a drain pan, for accumulation, isolation and removal of hot rinse water, flashed steam, and cooked food-stuff as discharged from said cook chamber, and to house, support, and enable the easy removal and reinsertion of said strainer;

a strainer, having sufficient capacity to capture all discharged food and a mesh size sufficient to capture all discharged food, for capturing, collecting, and draining cooked food-stuff discharged from said cook chamber and the quick separation of cooked food-stuff from rinse water; and a strainer interlock, for preventing the accidental and unscheduled removal of said strainer from said drain pan, and to safely isolate said drain pan interior hot surfaces, and moving parts from the operator.

31. The machine to fast cook raw food stuff in accordance with claim 30, wherein said cooking assembly being an assembly of a boiler, a cooking assembly top plate, a cooking assembly bottom plate, a cooking assembly enclosure and a cook chamber, providing for containment of said heat transfer fluid, having penetrations and mounting surfaces for the insertion and attachment of said surface temperature self-regulating heating elements, having penetrations and mounting surfaces for the attachment of fluid couplings fluidly connecting said high pressure pump, said expansion tank, said first pressure transducer, said second pressure transducer, said high temperature pressure switch, said low temperature pressure switch, said cook chamber inlet solenoid valve, said rinse solenoid valve, said first venting solenoid valve, and second venting solenoid valve, and having penetrations and mounting surfaces for the attachment of said upper slide plate valve assembly, said lower slide plate valve assembly, and said drain pan.

* * * * *